(12) United States Patent
Bloomfield et al.

(10) Patent No.: US 8,886,957 B2
(45) Date of Patent: Nov. 11, 2014

(54) SYSTEMS, METHODS, SOFTWARE, AND COMPONENTS USING TAMPER-PROOF REAL-TIME CLOCK

(75) Inventors: Jonathan Bloomfield, Lightwater (GB); Nicholas Murphy, The Sands (GB)

(73) Assignee: 3DLabs Inc. Ltd., Hamilton (BM)

( * ) Notice: Subject to any disclaimer, the term of this patent is extended or adjusted under 35 U.S.C. 154(b) by 535 days.

(21) Appl. No.: 12/942,986

(22) Filed: Nov. 9, 2010

(65) Prior Publication Data

US 2011/0173480 A1 Jul. 14, 2011

Related U.S. Application Data

(60) Provisional application No. 61/259,296, filed on Nov. 9, 2009.

(51) Int. Cl.
*G06F 21/00* (2013.01)
*G06F 21/72* (2013.01)
*G06F 1/14* (2006.01)

(52) U.S. Cl.
CPC ............. *G06F 1/14* (2013.01); *G06F 21/725* (2013.01)
USPC .............................. 713/189; 726/34; 713/601

(58) Field of Classification Search
CPC .................................. G06F 21/725; G06F 1/14
USPC ........................ 713/189, 601; 726/34
See application file for complete search history.

(56) References Cited

U.S. PATENT DOCUMENTS

| | | | |
|---|---|---|---|
| 6,023,690 A * | 2/2000 | Chrosny et al. | 705/405 |
| 6,772,361 B1 * | 8/2004 | Walsh | 713/502 |
| 6,968,384 B1 * | 11/2005 | Redding et al. | 709/229 |
| 7,343,496 B1 * | 3/2008 | Hsiang et al. | 713/194 |
| 2004/0128549 A1 * | 7/2004 | Poisner | 713/201 |
| 2005/0181761 A1 * | 8/2005 | Park | 455/410 |
| 2006/0265623 A1 * | 11/2006 | Dinescu | 713/600 |
| 2007/0074044 A1 * | 3/2007 | Brickell et al. | 713/187 |
| 2007/0110109 A1 * | 5/2007 | Jennings et al. | 370/516 |
| 2007/0198429 A1 * | 8/2007 | Coley et al. | 705/59 |
| 2007/0250675 A1 * | 10/2007 | Ono et al. | 711/163 |
| 2008/0155297 A1 * | 6/2008 | Madar et al. | 713/502 |
| 2008/0300887 A1 * | 12/2008 | Chen et al. | 705/1 |
| 2009/0238323 A1 * | 9/2009 | Haiplik et al. | 377/28 |
| 2009/0323107 A1 * | 12/2009 | Maeda | 358/1.15 |
| 2011/0066512 A1 | 3/2011 | Kanngard | |
| 2011/0173480 A1 | 7/2011 | Bloomfield | |

\* cited by examiner

*Primary Examiner* — Michael Pyzocha
(74) *Attorney, Agent, or Firm* — Kwan & Olynick LLP

(57) ABSTRACT

The write-access control line for an RTC is combined with a clear line for an RTC signature register, so that changes to the RTC will cause subsequent reads to return an invalidity flag.

18 Claims, 5 Drawing Sheets

GENERATE SIGNATURE
(function of:
local platform ID,
downloaded key,
RTC, etc.)

SAVE INTO RTC SIGNATURE REGISTER

CHECK SIGNATURE:
IF VALID, END.

*Fig. 3 : Initializing DRM*

(IN DRM SOFTWARE)

CHECK RTC SIGNATURE

IF not valid, END with error;
else:

(Get or check certificate
for this initialization
calculate end time
sign and store end time

END

_Fig. 4:_ _Install App or Media Rights_

(Call to DRM Software)

Validate Application
If invalid, Return with error

Look up and validate end date
If invalid, Return with error

Validate RTC
If invalid, Return with error

If RTC < Enddate,
Enable

(Return)

*Fig. 5 : Runtime - Launching Application or Use*

SYSTEMS, METHODS, SOFTWARE, AND COMPONENTS USING TAMPER-PROOF REAL-TIME CLOCK

CROSS-REFERENCE

Priority is claimed from U.S. Provisional Application 61/259,296 filed 10 Nov. 2009, which is hereby incorporated by reference.

BACKGROUND

The present application relates to tamper-proof operation of software which may have time-limited authorization.

Note that the points discussed below may reflect the hindsight gained from the disclosed inventions, and are not necessarily admitted to be prior art.

A Real Time Clock (RTC) is a system clock which maintains the date and time even while the system is in an unpowered state. RTCs are used in most computers and complex electronic systems, and are commonly implemented by a battery-backed low-power counter.

The RTC is convenient for the user, since (for example) a computer knows immediately, as soon as it is turned on, what the correct time is. However, RTCs also have an important role in software security.

The fundamental problem with the development and sale of software is control of end use. Since software is an intangible which (unless protected) can be copied, a seller will lose all control as soon as the first copy is released, unless special measures are taken.

Many systems have been developed to limit software operation to a particular system, but a more difficult problem is how to limit operation by time. The logical way to constrain software operation to a particular time interval is to reference the RTC, but the problem is that RTCs can normally be changed by the user. Thus a very common hack is to backdate a computer's RTC to within the authorized period, in order to obtain access to software outside the period of its authorization.

Digital Rights Management (DRM) is the general term for limiting the use of software. A subfield of this is Digital Content Management, where content (typical music or video) is authorized for viewing only during a limited time window. If the time window of use can be securely limited, it is possible for a content owner to rent movies; otherwise the content owner can only sell the content, at best.

Companies which generate valuable applications software would be much better protected if they could license use of their software for a monthly fee, rather than demanding a large flat fee for a permanent license. The net present value of a continuing monthly payment of (for example) $20 per month would be more than $1000, and many users would be far more likely to pay such a monthly fee than the equivalent lump sum. The availability of expensive software at low monthly fees has the potential to convert a large fraction of the black market into legitimate paid licensees, which would be a great economic benefit to the licensors and to many licensees. Note that the monthly fees are very easily enforceable, simply by withholding authorization for the monthly renewal. Also note that a software license could be denominated as an installment sale, and booked as such, even if the licensee pays only in monthly installments.

Typically calibration of the RTC itself is not required. Instead, a nonvolatile time offset register is used to store corrections. The operating system can also keep track of time zone changes separately.

SUMMARY

The present application discloses new approaches to software security. A new hardware architecture detects unauthorized changes to the system clock so that any affected media license can be invalidated. A securely verified RTC signature establishes validity of a software or content license activation by implementing a securely validated system date/time check. The inventions detect any unauthorized changes to the system's date/time settings to invalidate affected licenses.

The disclosed innovations, in various embodiments, provide one or more of at least the following advantages. However, not all of these advantages result from every one of the innovations disclosed, and this list of advantages does not limit the various claimed inventions.

- improved security preventing reactivation of time invalidated software licenses;
- secured, authorized access to the RTC; and
- tamper-proof digital signatures to a RTC to verify date/time for software licensure.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 3 is a flowchart depicting initialization of the DRM software.

FIG. 4 is a flowchart depicting initialization of an application, or of a usage right, operating under the DRM software.

FIG. 5 is a flowchart showing use of an application, or of a usage right, operating under the DRM software.

Appendix A shows an example of a complex integrated circuit which includes a tamperproof realtime clock.

Appendix B shows an example of a complete module incorporating the media processor of Appendix A, and including a tamperproof realtime clock.

Appendix C shows another example of a complex integrated circuit which includes a tamperproof realtime clock.

Appendix D shows an example of a complete module incorporating the media processor of Appendix C, and including a tamperproof realtime clock.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

This application discloses an innovative configuration for hardware and software for digitally signing an RTC by DRM software.

Figure 1:
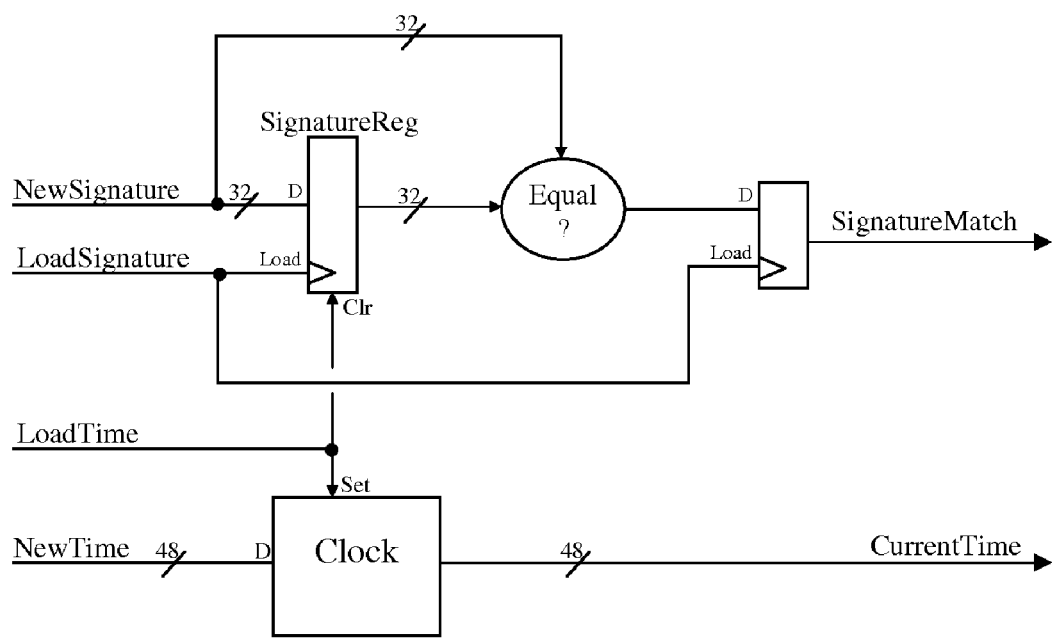
FIG. 1 shows an example of the innovative hardware.

FIG. 1 shows a hardware configuration allowing DRM software to digitally sign the RTC when a software license is granted. This configuration implements a tamper-proof digital signature for the RTC. A New Signature digital input ("NewSignature") goes into a register SignatureReg (e.g., a programmable Control Status Register), and this input NewSignature also provides feedforward input to a digital comparator 120. A control signal LoadSignature is provided to the Load input of the register 110 as well as to the Load input of a Signature Match Register 130. The Register 130 provides a validity signal SignatureMatch.

An input signal LoadTime provides a SET input to the Clock 145 as well as a reset signal CLR to the Digital Signature Register 110. A data input NewTime provides a digital input to the clock 145. The clock 145 continually provides a time data output CurrentTime (48 bits in this example).

The Digital Signature is stored within the RTC in the non-volatile (e.g. battery-backed) register 110, and this register 110 is automatically reset or cleared to a Zero state when the system time is modified. The LoadTime control input 110 is also connected to the clear input CLR of the register 110, so that, if a user modifies the RTC time, the register 110 will be wiped.

Note that the Signature Register 110 is write-only—its value can be modified, but never directly inspected. This combines synergistically with the secured validation: the stored signature will disappear forever if tampering occurs, so all validations which depend on that signature value will be disabled. This combination makes it impossible for a user to re-instate the stored signature(s) after modifying the time on the RTC.

The DRM Software verifies the signature by re-writing the expected value into the Signature Register and testing a status flag as implemented by the comparator element 120 checking and the Signature Match Register 130 to determine whether the signature was modified by the write. If the clock time remains un-modified, the test will confirm that the value written matched the old contents, and the DRM Software can be confident that neither the signature, nor the system clock, have been tampered with. If the time has been modified (tampered with) after the RTC has been signed, the Signature will have been reset to a Zero state, and the test will indicate a mismatch. Any attempt by the user to determine the contents of the Signature Register (via the verification mechanism) will result in the Signed Register being overwritten at the first attempt.

This example uses a 32-bit Signature Register, but the claimed innovations are not specifically restricted to this size. To be effective the Signature need only be wide enough to make a first time guess improbable.

Figure 2:
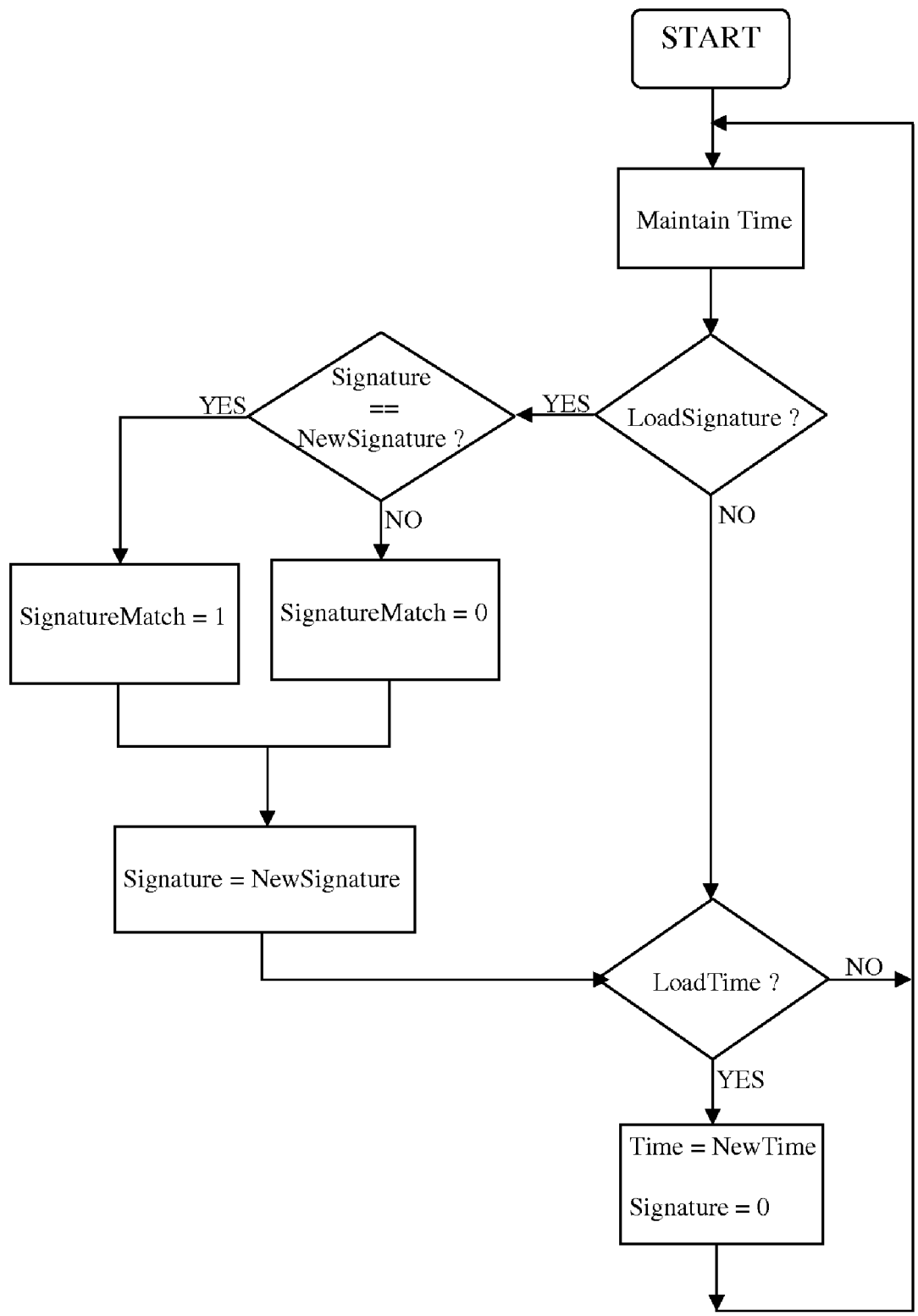
FIG. 2 is a flowchart depicting the logical operation of the hardware in accordance with an embodiment.

FIG. 2 is a flowchart depicting the logical operation of the hardware in accordance with an embodiment. In this embodiment, at the START, operation goes to the Maintain Time operation. The operation simply loops as long as no LoadSignature or LoadTime input is received. If a LoadSignature input is received on the control input of the register SignatureReg, the new signature and old signature are compared. (Note that the old signature is never made available as a data output.) If the old signature value is equal to the new signature value NewSignature, the comparison bit SignatureMatch is set to 1 (valid). If these two values differ, the SignatureMatch bit is set to 0 (invalid).

Having updated SignatureMatch, the Signature is assigned to the new value NewSignature, and a test is made to determine whether a LoadTime signal has been received. If so (at this point in the program sequence), the Time value of the RTC is updated to the new value, and the Signature value in SignatureReg is reset to zero. Control then returns to the main loop until either a new signature and/or time input is detected.

FIG. 3 is a flowchart depicting initialization of the DRM software. (This would occur, for example, when the computer or handheld unit is first initialized, or when DRM software is first installed.) There will typically be various unpacking and initialization steps, but FIG. 3 starts with the important step of generating a signature value.

The signature value can be generated according to any of a variety of known algorithms; typically it will be a function of a unique number which is hardware-encoded into a particular computer or handheld unit's primary elements, as well as a downloaded digital key, and the real-time clock's time value. The downloaded digital key can optionally contain implicit time information, or the key generation algorithm can optionally make use of a global time value downloaded from an external reference. However, neither of these is required.

The Signature value thus generated is saved into the RTC signature register SignatureReg. The signature value is then checked, by a test cycle of the validation logic (shown in FIG. 2); if this check is successful, the signature value may not ever need to be written over again.

FIG. 4 is a flowchart depicting initialization of an application, or of a usage right, operating under the DRM software. First, the validity of the signature value in SignatureReg is checked, using a procedure like that shown in FIG. 2. If the signature is not valid, then the process halts and (preferably) sets an error value.

The DRM software will then check certificate status for the current installation, and, if tests come up valid, will sign and store an end time (expiration time) for the current installation. The algorithm used for this signature can use a conventional public key relation, or can be a simple hash.

FIG. 5 is a flowchart showing use of an application, or of a usage right, operating under the DRM software. The DRM software itself is preferably launched first, e.g. when the computer or handheld device is first powered up.

To launch a protected application or usage right, the DRM software generates a Signature, provides the Signature to the RTC Signature Register, and halts the process if no match is found (i.e. if SignatureMatch=0).

If the Signatures match (SignatureMatch=1), the DRM software checks the RTC value to see if it is within bounds (i.e. if the end date Enddate has been reached yet). If the RTC value is out of bounds, a halt/error condition stops operation of the program, otherwise, the DRM program proceeds.

Appendix A shows an example of a complex integrated circuit (a media processor, in this example) which includes a tamperproof realtime clock. This multi-core design combines dual ARM® cores with a flexible media processing array to achieve fully balanced acceleration of CPU and media-intensive tasks. A broad range of I/Os and peripheral functions are integrated on-chip to ease system design and reduce BoM costs. Some features and advantages of this example include: flexible media processing; a high compute density SIMD architecture ideally suited for media processing tasks; performance and flexibility to accelerate a wide range of current and emerging standards; secure JTAG; ideally suited to video, imaging, 2D/3D graphics, audio and signal processing; protected RTC; offloads the CPU from intensive media tasks; 32K L1 cache; Optimal power management; High-Definition Video; 12 C; 12 S, and high-resolution 720p decode and encode. This particular example includes a wide range of video codecs, including; GPIO, H.264, MPEG 1/2/4, WMV/VC-1 and others The performance, flexibility and low power consumption of the this chip make it ideally suited to a broad range of portable and embedded applications. Examples of these integrated systems (discussed in further detail below) include: Portable Media Players; Mobile Internet Devices; Portable Navigation Devices; Video Conferencing; Video Surveillance; Automotive Infotainment; Smartphone and PDA; IP Media devices; Digital Signage; and other embedded systems.

Appendix B shows an example of a complete module incorporating the media processor of Appendix A, and including a tamperproof realtime clock.

Appendix C shows another example of a complex integrated circuit (another media processor, in this example) which includes a tamperproof realtime clock.

Appendix D shows an example of a complete module incorporating the media processor of Appendix C, and including a tamperproof realtime clock.

In another example, a cellphone with a tamper-proof realtime clock can be used to provide controlled physical access. Only a very small app is needed on the cellphone side.

Where access to only a single location is needed (such as a concert, amusement park, campus with security needs, or special-access section of a university or corporate campus), the access-control paradigm can be local to the controlled entry. Historically, employees have often been required to carry a picture badge, and such a badge would be scanned by a guard who could block physical access to a doorway. If the human guard is replaced by an image-scanner and face-recognition software, that still does not change the basic paradigm. (Roughly this might be summarized as: Badge valid? Image on badge? Matches real-time image of human at access point? No alarms? No inconsistency with other observations? Permit entry.) This old paradigm is a "dumb badge" paradigm, i.e. the user and badge are not relied on for any self-authentication whatever.

The present application discloses a "smart badge" architecture, where an entrant carries hardware (e.g. a cell phone or other small computing device) which includes at least some self-authentication, using a secure real-time clock. This is most easily implemented if the hardware also includes a unique local identification code. (Ideally, one or more cryptographic relationships are used to assure that mere copying and replication of the stored information will not result in a functional "cloned" chip. This can be done by making the validation code not separately readable, as above, or separately by adding in external validation for some particular applications.

This leads to a distributed architecture for secure access, which is far more scalable AND permits more convenient access. For example, admissions to concerts and amusement park can remove any need for waiting in lines. This can be implemented by a sequence in which a consumer electronically purchases access for a certain number of people for a certain event (or day), before arriving at the event. That consumer's mobile phone, if suitably equipped with a secure real-time-clock and with authenticating software as described above, can receive a "key" value and self-authenticate itself at a wireless admission gate. Similarly, a commuter might buy a monthly pass for unlimited railroad travel within a certain time—e.g. one month. Instead of (or in addition to) issuing a physical ticket which must be shown, a self-authentication routine can be installed in the commuter's cell phone. In higher security applications, of course, remote authentication can be used as a backup. In addition, offline auditing can be used, even where distributed self-authentication is allowed, to flag suspicious activity on any one device or certificate, and update a hot list of suspect devices accordingly.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In one example, the chip's unique identification itself can be secured by the same erasure relationship: if the RTC or chip ID is changed by the user, BOTH are cleared. This more drastic response provides an additional level of security, but also has a downside: in many contexts, some mechanism for reinitializing a mobile device which has been thus crashed would be required, to permit appropriate handling of innocent users who may have gotten tricked. In some contexts, of course, a device which becomes permanently useless if compromised is desirable; an electronic key or a cash-equivalent card would be examples of such contexts. This also simplifies implementation, particularly with very-low-power devices having minimal circuit complexity, since a unique identification can be stored in ordinary nonvolatile memory, with security provided by this "self-destruct" relationship.

In the example described above, only one signature register is described. In alternative versions, more secure signature register space can be included if desired. However, the preferred embodiment provides only one signature storage location as described above; this is sufficient to permit one security management software layer to issue local authorizations or enable local operation. In mobile applications, economical use of power and silicon are particularly desirable.

This would permit multiple independent security management applications to be installed, each with its own crypto relationships. Preferably (but not necessarily), all such registers would be locked into the same reset relation, so tampering with one would invalidate all. This permits different vendors (or certificate authorities) to set up their own secure validation architectures which are each separately sealed against tampering.

In practice, the RTC counter is adjusted quite infrequently, if at all. The RTC Time forms a reference value to which the system adds a separately recorded TimeDelta. The TimeDelta indicates the difference between RTC Time and Real-Time and it is TimeDelta which is adjusted to offset any drift in the RTC not the RTC Time. Normal software calculates Absolute-Time as 'RTC+TimeDelta'. DRM software normally ignores TimeDelta, since the DRM Software doesn't need the true time, just the approximate period of time elapsed since the license was generated. In one alternative, if a particular application requires that the RTC Time is ever legally adjusted it would be adjusted by DRM aware code, which would re-instate the Signature, or compute a new one, whenever the RTC Time is updated.

In another class of contemplated applications, the tamperproof RTC operation can also be used to assure security of other types of information. For example, if timestamps are generated using the RTC data, and signed using (as one component of the encryption algorithm) the time and signature from the RTC, a security application can later rely on the signed data IF the RTC signature matches and is still valid.

The RTC data is a very special case with unique properties, which combine synergistically with the architecture and methods described above. (The RTC has very particular properties—it can be read by any software, can only be modified by trusted software, and the value that is protected is constantly changed by hardware.) More generally, these architectures and methods provide a way of protecting dynamic data with a static value (where "dynamic" means changing without software intervention). In the case of the RTC the time is constantly changing, so it is impossible to tell in isolation whether the current value is correct, hence the need for a signature. Most other data that needs protecting is not dynamic and can use encryption (as would the static value in this invention), and thus does not require the architectures and methods described above. However, it is conceivable that these architectures and methods could also be adapted to an application where some hardware resource is monitored. For example, a secure network architecture might allow each node to send only a certain assigned number of packets before re-authenticating; hardware logic could be used to count the packets and report the value in a register. This data would be "dynamic," and could be protected by architectures and methods analogous to those describe above for protecting the integrity of the RTC. Nevertheless, since almost every computer or complex electronic system includes a real-time clock, the unique RTC application is believed to be more advantageous than all the others.

There are also enormous applications of this security architecture to e-commerce and e-payment systems. If the timestamps at various local computers can be authenticated, it is much easier for a large distributed-mesh system architecture to retain security. See e.g. U.S. patent application Ser. No. 12/764,926, "Applications of Stored Value Card," which is hereby incorporated by reference in its entirety.

Note that the RTC can be stabilized with a crystal resonator (or other high-Q device), or can (less preferably) be implemented as a free-running oscillator.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A device, comprising:
   instruction execution logic operable to execute a plurality of software instructions;
   a real-time clock configured to maintain and provide a system time;
   a signature storage register having a write-access control line inaccessible to a user, wherein the signature storage register is configured to hold a digital signature for the real-time clock generated by digital rights management software when a software license is granted, wherein the signature storage register includes an invalidation control line connected to the real-time clock;
   wherein the invalidation control line forces the signature register into an invalid state whenever the write-access control line goes active.

2. The device of claim 1, wherein the real-time clock is configured to maintain the system time in nonvolatile memory.

3. The device of claim 1, wherein the digital signature is cleared when the system time is modified.

4. The device of claim 1, wherein the signature storage register is write only.

5. The device of claim 1, wherein digital rights management (DRM) software verifies the digital signature by generating a new signature for the real-time clock and determining if the new signature corresponds to the digital signature maintained in the signature storage register.

6. The device of claim 1, wherein the digital signature is generated based on a unique hardware-encoded value.

7. The device of claim 1, wherein the digital signature is generated based on a unique hardware-encoded value and a current system time.

8. The device of claim 1, wherein the invalidation control line is a clear input.

9. The device of claim 1, wherein the invalidation control line is electrically connected to the write-access control line.

10. A method, comprising:
    receiving a software license grant;
    generating a digital signature for a real-time clock configured to maintain and provide a system time;
    storing the digital signature in a signature storage register having a write-access control line inaccessible to a user, wherein the signature storage register is configured to hold a digital signature for the real-time clock, wherein the signature storage register includes an invalidation control line connected to the real-time clock;
    wherein the invalidation control line forces the signature register into an invalid state whenever the write-access control line goes active.

11. The method of claim 10, wherein the real-time clock is configured to maintain the system time in nonvolatile memory.

12. The method of claim 10, wherein the digital signature is cleared when the system time is modified.

13. The method of claim 10, wherein the signature storage register is write only.

14. The method of claim 10, wherein digital rights management (DRM) software verifies the digital signature by generating a new signature for the real-time clock and determining if the new signature corresponds to the digital signature maintained in the signature storage register.

15. The method of claim 10, wherein the digital signature is generated based on a unique hardware-encoded value.

16. The method of claim 10, wherein the digital signature is generated based on a unique hardware-encoded value and a current system time.

17. The method of claim 10, wherein the invalidation control line is a clear input.

18. The method of claim 10, wherein the invalidation control line is electrically connected to the write-access control line.

* * * * *